(12) United States Patent
Yu et al.

(10) Patent No.: US 7,715,491 B2
(45) Date of Patent: May 11, 2010

(54) SYSTEM FOR PROCESSING AND TRANSMITTING DIGITAL BROADCASTING SIGNAL AND METHOD THEREOF

(75) Inventors: Jung-pil Yu, Suwon-si (KR); Hae-joo Jeong, Seoul (KR); Eui-jun Park, Seoul (KR); Joon-soo Kim, Seoul (KR); Yong-sik Kwon, Seoul (KR); Jin-Hee Jeong, Anyang-si (KR); Yong-deok Chang, Suwon-si (KR); Kum-ran Ji, Seoul (KR); Jong-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 892 days.

(21) Appl. No.: 11/504,724

(22) Filed: Aug. 16, 2006

(65) Prior Publication Data

US 2007/0092031 A1   Apr. 26, 2007

Related U.S. Application Data

(60) Provisional application No. 60/728,777, filed on Oct. 21, 2005, provisional application No. 60/734,295, filed on Nov. 8, 2005, provisional application No. 60/738,050, filed on Nov. 21, 2005, provisional application No. 60/739,448, filed on Nov. 25, 2005, provisional application No. 60/788,707, filed on Apr. 4, 2006.

(30) Foreign Application Priority Data

Jul. 20, 2006   (KR) ...................... 10-2006-0068033

(51) Int. Cl.
*H04L 27/00* (2006.01)

(52) U.S. Cl. ........................ 375/295; 375/260; 375/341

(58) Field of Classification Search ................. 375/265, 375/260, 295, 341
See application file for complete search history.

(56) References Cited

U.S. PATENT DOCUMENTS

2003/0039318 A1 * 2/2003 Tong et al. .................. 375/298

(Continued)

FOREIGN PATENT DOCUMENTS

JP         2000-244424         9/2000

(Continued)

OTHER PUBLICATIONS

International Search Report mailed on Feb. 6, 2007, in International Application No. PCT/KR2006/004319.

(Continued)

*Primary Examiner*—Emmanuel Bayard
(74) *Attorney, Agent, or Firm*—Sughrue Mion, PLLC

(57) ABSTRACT

A system for transmitting a digital broadcasting signal includes a supplementary reference signal (SRS) inserter receiving a dual transport stream in which a normal stream and a turbo stream are multiplexed, and inserting an SRS into a stuffing region provided in the dual transport stream, a Reed-Solomon encoder encoding the dual transport stream having the SRS inserted therein, an interleaver interleaving the encoded dual transport stream, a turbo processor detecting and encoding the turbo stream from the interleaved dual transport stream, stuffing the dual transport stream with the encoded turbo stream, and compensating for a parity corresponding to the encoded turbo stream, and a trellis/parity corrector performing a trellis encoding of the dual transport stream processed by the turbo processor, which can robustly process a turbo stream included in the dual transport stream and easily confirm the channel state between a transmitter side and a receiver side.

30 Claims, 7 Drawing Sheets

U.S. PATENT DOCUMENTS

2003/0079173 A1 4/2003 Birru
2003/0235166 A1* 12/2003 Son et al. .................. 370/334

FOREIGN PATENT DOCUMENTS

JP 2000-244841 9/2000
JP 2004-194265 7/2004

OTHER PUBLICATIONS

Written Opinion of the International Searching Authority mailed on Feb. 6, 2007, in International Application No. PCT/KR2006/004319.
U.S. Appl. No. 11/416,254, filed May 3, 2006, Jung-pil Yu et al., Samsung Electronics Co., Ltd.
U.S. Appl. No. 11/416,258, filed May 3, 2006, Yong-sik Kwon et al., Samsung Electronics Co., Ltd.
U.S. Appl. No. 11/416,457, filed May 3, 2006, Jung-pil Yu et al., Samsung Electronics Co., Ltd.
U.S. Appl. No. 11/503,970, filed Aug. 15, 2006, Jung-pil Yu et al., Samsung Electronics Co., Ltd.
U.S. Appl. No. 11/504,024, filed Aug. 15, 2006, Jung-pil Yu et al., Samsung Electronics Co., Ltd.
U.S. Appl. No. 11/504,027, filed Aug. 15, 2006, Jung-pil Yu et al., Samsung Electronics Co., Ltd.
U.S. Appl. No. 11/504,029, filed Aug. 15, 2006, Jung-pil Yu et al., Samsung Electronics Co., Ltd.
U.S. Appl. No. 11/504,030, filed Aug. 15, 2006, Jung-pil Yu et al., Samsung Electronics Co., Ltd.
U.S. Appl. No. 11/504,031, filed Aug. 15, 2006, Jung-pil Yu et al., Samsung Electronics Co., Ltd.
U.S. Appl. No. 11/504,038, filed Aug. 15, 2006, Jung-pil Yu et al., Samsung Electronics Co., Ltd.
U.S. Appl. No. 11/504,651, filed Aug. 16, 2006, Jung-pil Yu et al., Samsung Electronics Co., Ltd.
U.S. Appl. No. 11/504,725, filed Aug. 16, 2006, Jung-pil Yu et al., Samsung Electronics Co., Ltd.
U.S. Appl. No. 11/504,726, filed Aug. 16, 2006, Jung-pil Yu et al., Samsung Electronics Co., Ltd.
U.S. Appl. No. 11/505,369, filed Aug. 17, 2006, Jung-pil Yu et al., Samsung Electronics Co., Ltd.
U.S. Appl. No. 11/505,894, filed Aug. 18, 2006, Eui-jun Park et al., Samsung Electronics Co., Ltd.
U.S. Appl. No. 11/508,144, filed Aug. 23, 2006, Jung-pil Yu et al., Samsung Electronics Co., Ltd.
U.S. Appl. No. 11/523,716, filed Sep. 20, 2006, Jung-pil Yu et al., Samsung Electronics Co., Ltd.
U.S. Appl. No. 11/692,509, filed Mar. 28, 2007, Hae-joo Jeong et al., Samsung Electronics Co., Ltd.

* cited by examiner

| SYNC | PID | AF Header | SRS | Turbo Data |
|------|-----|-----------|-----|------------|
| SYNC | PID | AF Header | SRS | Normal Data |
| SYNC | PID | AF Header | SRS | Normal Data |
| SYNC | PID | AF Header | SRS | Normal Data |
| 1 | 3 | 2 | S | 182-S |

SYSTEM FOR PROCESSING AND TRANSMITTING DIGITAL BROADCASTING SIGNAL AND METHOD THEREOF

CROSS-REFERENCE TO RELATED APPLICATIONS

This application claims the benefit of U.S. patent application Ser. No. 60/728,777, filed Oct. 21, 2005, U.S. patent application Ser. No. 60/734,295, filed Nov. 8, 2005, U.S. patent application Ser. No. 60/739,448, filed Nov. 25, 2005, U.S. patent application Ser. No. 60/788,707, filed Apr. 4, 2006, U.S. patent application Ser. No. 60/738,050, filed Nov. 21, 2005, and Korean Patent Application No. 2006-68033, filed Jul. 20, 2006 in the Korean Intellectual Property Office, the disclosures of which are incorporated herein by reference.

BACKGROUND OF THE INVENTION

1. Field of the Invention

Aspects of the present invention relate to a system for processing and transmitting a digital broadcasting signal and a method thereof, which can robustly process and transmit a digital broadcasting transport stream, and more particularly, to a system for processing and transmitting a digital broadcasting signal and a method thereof, which robustly process and transmit a digital broadcasting transport stream with a simple construction, that strives for the performance improvement through performing an information exchange and mapping on a dual transport stream including normal data and robust data, and which can confirm the channel state using a supplementary reference signal, in order to improve the receiving performance of an Advanced Television Systems Committee (ATSC) Vestigial Side Band (VSB) system that is an American type digital terrestrial broadcasting system.

2. Description of the Related Art

An Advanced Television Systems Committee (ATSC) Vestigial Side Band (VSB) system an American type digital terrestrial broadcasting system and is a signal carrier type broadcasting system. The ATSC VSB system uses a field sync signal in the unit of 312 segments. Accordingly, this system's receiving performance is not good in an inferior channel, and particularly, in a Doppler fading channel.

FIG. 1 is a block diagram illustrating the construction of a transmitter/receiver of an ATSC DTV standard as a general American type digital terrestrial broadcasting system. The digital broadcast transmitter of FIG. 1 is an enhanced VSB (EVSB) system proposed by Philips, which forms and transmits a dual stream. The dual stream is produced by adding robust data to normal data of the basic ATSC VSB system. As illustrated in FIG. 1, the digital broadcast transmitter includes a randomizer 11 randomizing a dual stream. A Reed-Solomon (RS) encoder 12 in the form of a concatenated coder adds parity bytes to the transport stream in order to correct errors occurring due to the channel characteristics in a transport process. An interleaver 13 interleaves the RS-encoded data according to a specified pattern. A ⅔-rate trellis encoder 14 maps the interleaved data onto 8-level symbols by performing a ⅔-rate trellis encoding of the interleaved data. The digital broadcast transmitter performs an error correction coding of the dual stream.

The digital broadcast transmitter further includes a multiplexer 15 inserting a field sync signal and a segment sync signal into the error-correction-coded data as illustrated in FIG. 2. A modulator 16 inserts a pilot tone into the data symbols into which the segment sync signal and the field sync signal have been inserted by adding a specified DC value to the data symbols. The modulator 16 performs a VSB modulation of the data symbols by pulse-shaping the data symbols, and up-converts the modulated data symbols into an RF channel band signal to transmit the RF channel band signal.

In the digital broadcast transmitter, the normal data and the robust data are multiplexed (not illustrated) according to a dual stream system that transmits the normal data and the robust data through one channel. The multiplexed data is inputted to the randomizer 11. The input data is randomized through the randomizer 11, outer-encoded through the RS encoder 120 that is an outer encoder, and then distributed through the interleaver 13.

Also, the interleaved data is inner-encoded in the unit of 12 symbols through the trellis encoder 14, and then mapped onto the 8-level symbols. After the field sync signal and the segment sync signal are inserted into the encoded data, the data is VSB-modulated by inserting the pilot tone into the data, and converted into an RF signal.

The digital broadcast receiver of FIG. 1 includes a tuner (not illustrated) converting an RF signal received through a channel into a baseband signal. A demodulator 21 performs a sync detection and demodulation of the converted baseband signal. An equalizer 22 compensates for a channel distortion of the demodulated signal occurring due to a multi-path. A Viterbi decoder 23 corrects errors of the equalized signal and decodes the error-corrected signal to symbol data. A deinterleaver 24 rearranges the data distributed by the interleaver 13 of the digital broadcast transmitter. A RS decoder 25 corrects errors. A derandomizer 26 de-randomizes the data corrected through the RS decoder 25 and outputs an MPEG-2 transport stream. Accordingly, the digital broadcast receiver of FIG. 1 down-converts the RF signal into the baseband signal, demodulates and equalizes the converted signal, and then channel-decodes the demodulated signal to restore the original signal.

FIG. 2 illustrates a VSB data frame for use in the American type digital broadcasting (8-VSB) system, into which a segment sync signal and a field sync signal are inserted. As shown in FIG. 2, one frame is composed of two fields. One field is composed of one field sync segment that is the first segment, and 312 data segments. Also, one segment in the VSB data frame corresponds to one MPEG-2 packet, and is composed of a segment sync signal of four symbols and 828 data symbols. In FIG. 2, the segment sync signal and the field sync signal are used for the synchronization and equalization in the digital broadcast receiver. That is, the field sync signal and the segment sync signal refer to known data between the digital broadcast transmitter and receiver, which is used as a reference signal when the equalization is performed in the receiver side.

The American type digital terrestrial broadcasting system as illustrated in FIG. 1 is a system that can form and transmit a dual stream produced by adding the robust data to the normal data of the existing ATSC VSB system. This system transmits the robust data together with the existing normal data. However, the American type digital terrestrial broadcasting system of FIG. 1 has the problem that it has almost no effect of improving the inferior receiving performance in a multipath channel due to the transmission of the existing normal data, even though the system transmits the dual stream produced by adding the robust data to the normal data. That is, the robust data has almost no effect of improving the receiving performance according to the improvement of the normal stream.

Also, even with respect to a turbo stream, the robust data does not have a great effect of improving the receiving performance in a multipath environment.

In addition, according to the conventional digital broadcasting system, it is impossible to confirm the channel state between a transmitter side and a receiver side.

SUMMARY OF THE INVENTION

An aspect of the present invention is to provide a system for transmitting a digital broadcasting signal and a method thereof, which can robustly process a turbo stream included in a dual transport stream having a normal stream and the turbo stream with a simple construction, and/or can easily confirm the channel state between a transmitter side and a receiver side, in order to improve the receiving performance of an ATSC VSB system that is an American type digital terrestrial broadcasting system.

According to an aspect of the invention, a system for transmitting a digital broadcasting signal includes a supplementary reference signal inserter receiving a dual transport stream in which a normal stream and a turbo stream are multiplexed, and inserting a supplementary reference signal into a stuffing region provided in the dual transport stream, a Reed-Solomon (RS) encoder encoding the dual transport stream having the supplementary reference signal inserted therein, an interleaver interleaving the encoded dual transport stream, a turbo processor detecting and encoding the turbo stream from the interleaved dual transport stream, stuffing the dual transport stream with the encoded turbo stream, and compensating for a parity corresponding to the encoded turbo stream, and a trellis/parity corrector performing a trellis encoding of the dual transport stream processed by the turbo processor.

According to an aspect of the invention, the system further includes a transport stream constructor generating the dual transport stream by multiplexing the normal stream and the turbo stream.

According to an aspect of the invention, the system further includes a randomizer randomizing the dual transport stream generated by the transport stream constructor and providing the randomized transport stream to the supplementary reference signal inserter.

According to an aspect of the invention, the turbo processor includes a turbo stream detector detecting the turbo stream from the interleaved dual transport stream, an outer encoder inserting the parity for the detected turbo stream into a parity insertion region, an outer interleaver interleaving the turbo stream processed by the outer encoder, a turbo stream stuffer reconstructing the dual transport stream by inserting the interleaved turbo stream into the dual transport stream, and a parity compensator regenerating and adding the parity of the reconstructed dual transport stream to the dual transport stream.

According to an aspect of the invention, the turbo processor further includes a byte-to-symbol converter converting the unit of the interleaved dual transport stream from byte to symbol, and a symbol-to-byte converter converting the unit of the dual transport stream, to which the parity regenerated by the parity compensator has been added, from symbol to byte.

According to an aspect of the invention, the system further includes a transmitter transmitting the trellis-encoded dual transport stream.

According to an aspect of the invention, the transmitter includes a multiplexer (MUX) adding a sync signal to the trellis-encoded dual transport stream, a pilot inserter inserting a pilot into the dual transport stream to which the sync signal has been added, a pre-equalizer equalizing the dual transport stream into which the pilot has been inserted, a VSB modulator performing a VSB modulation of the equalized dual transport stream, and an RF modulator modulating the VSB-modulated dual transport stream with an RF channel band signal to transmit the modulated dual transport stream.

According to an aspect of the invention, the trellis/parity corrector proceeds to initialization before encoding the supplementary reference signal, and compensates for the parity according to a value that is changed due to the initialization.

According to an aspect of the invention, the trellis/parity corrector includes a trellis encoder block proceeding to the initialization when an external control signal corresponding to the initialization region is received and outputting a pre-stored value as an initial value, an RS encoder generating a parity corresponding to the initial value, and an adder correcting the parity of the dual transport stream by adding the parity generated by the RS encoder to the dual transport stream.

According to an aspect of the invention, the trellis/parity corrector further includes a MUX providing the dual transport stream having the parity corrected by the adder to the trellis encoder block, and a mapper performing a symbol mapping of the dual transport stream trellis-encoded by the trellis encoder block.

According to an aspect of the invention, the trellis encoder block includes a plurality of trellis encoders, and each trellis encoder includes a plurality of memories storing specified values, a first MUX receiving and outputting one of two bits located before the input of the supplementary reference signal, and when the external control signal is received, selecting and outputting the storage value stored in the first memory among the plurality of memories, a first adder adding an output value outputted from the first MUX and the storage value stored in the first memory, and storing its output value in the first memory, a second MUX receiving and outputting the other of the two bits located before the input of the supplementary reference signal, and when the external control signal is received, selecting and outputting the storage value stored in the second memory among the plurality of memories, and a second adder adding an output value of the second MUX and the storage value stored in the second memory, and storing its output value in the third memory among the plurality of memories.

According to an aspect of the invention, the value pre-stored in the third memory is shifted to and stored in the second memory, and the value pre-stored in the first memory and the value pre-stored in the second memory is provided to the RS encoder as the initial values.

In another aspect of the present invention, there is provided a method of processing a digital broadcasting signal, which includes receiving a dual transport stream in which a normal stream and a turbo stream are multiplexed, and inserting a supplementary reference signal into a stuffing region provided in the dual transport stream, encoding the dual transport stream having the supplementary reference signal inserted therein, interleaving the encoded dual transport stream, performing a turbo process by detecting and encoding the turbo stream from the interleaved dual transport stream, stuffing the dual transport stream with the encoded turbo stream, and compensating for a parity corresponding to the encoded turbo stream, and performing a trellis encoding of the turbo-processed dual transport stream.

According to an aspect of the invention, the method further includes generating the dual transport stream by multiplexing the normal stream and the turbo stream.

According to an aspect of the invention, the method further includes, prior to receiving a dual transport stream, randomizing the dual transport stream.

According to an aspect of the invention, the performing the turbo process includes detecting the turbo stream from the interleaved dual transport stream, performing an outer encoding of the detected turbo stream by inserting the parity for the detected turbo stream into a parity insertion region, interleaving the outer-encoded turbo stream, reconstructing the dual transport stream by inserting the interleaved turbo stream into the dual transport stream, and regenerating and adding the parity of the reconstructed dual transport stream to the dual transport stream.

According to an aspect of the invention, the performing the turbo process further includes converting the unit of the interleaved dual transport stream from byte to symbol, and converting the unit of the dual transport stream having the regenerated parity added thereto from symbol to byte.

According to an aspect of the invention, the method further includes adding a sync signal to the trellis-encoded dual transport stream, and transmitting the dual transport stream having the sync signal added thereto.

According to an aspect of the invention, the transmitting the dual transport stream includes inserting a pilot into the dual transport stream to which the sync signal has been added, equalizing the dual transport stream into which the pilot has been inserted, performing a VSB modulation of the equalized dual transport stream, and modulating the VSB-modulated dual transport stream with an RF channel band signal to transmit the modulated dual transport stream.

According to an aspect of the invention, the performing the trellis encoding includes initializing a trellis encoder performing the trellis encoding, and compensating for the parity of the dual transport stream, using the parity for the initial value corresponding to the value pre-stored in the trellis encoder.

Additional aspects and/or advantages of the invention will be set forth in part in the description which follows and, in part, will be obvious from the description, or may be learned by practice of the invention.

BRIEF DESCRIPTION OF THE DRAWINGS

The above and other aspects and/or features of the present invention will be more apparent and more readily appreciated by describing certain embodiments of the present invention with reference to the accompanying drawings, in which.

DETAILED DESCRIPTION OF THE EMBODIMENTS

Figure 1:
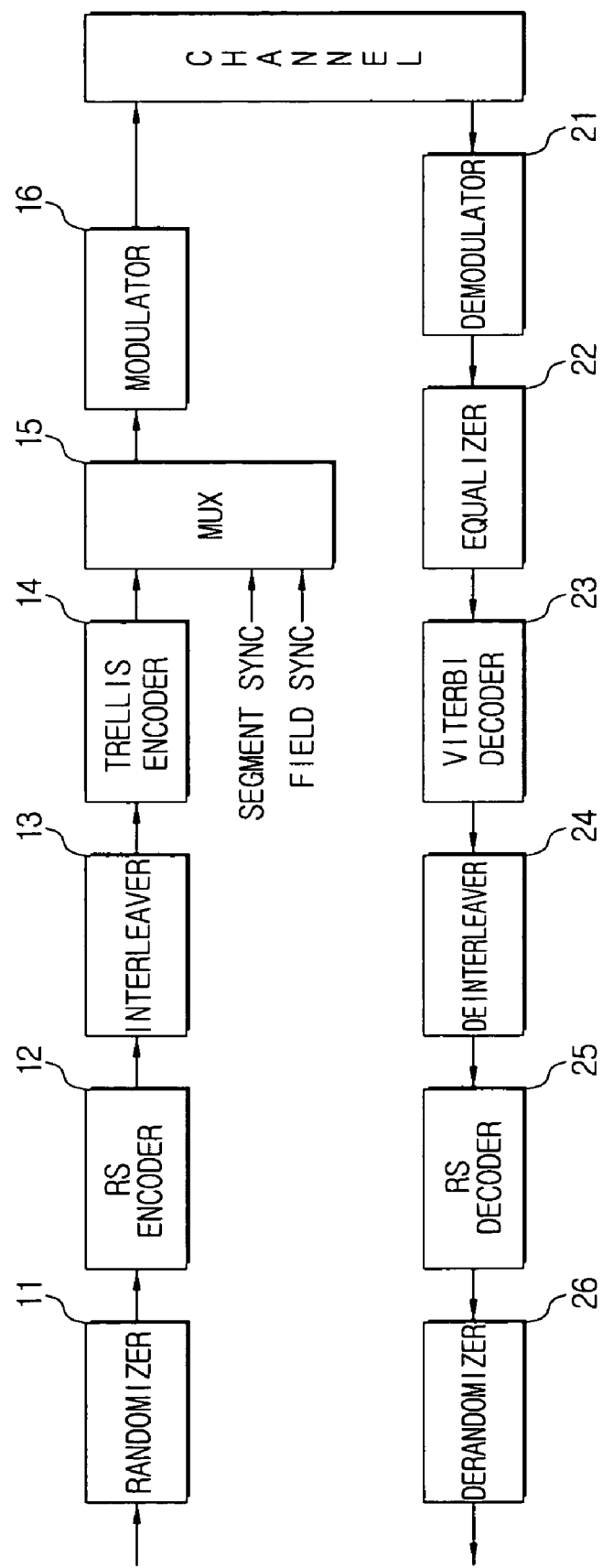
FIG. 1 is a block diagram illustrating the construction of a conventional digital broadcast (ATSC VSB) transmitting/receiving system.
Figure 2:
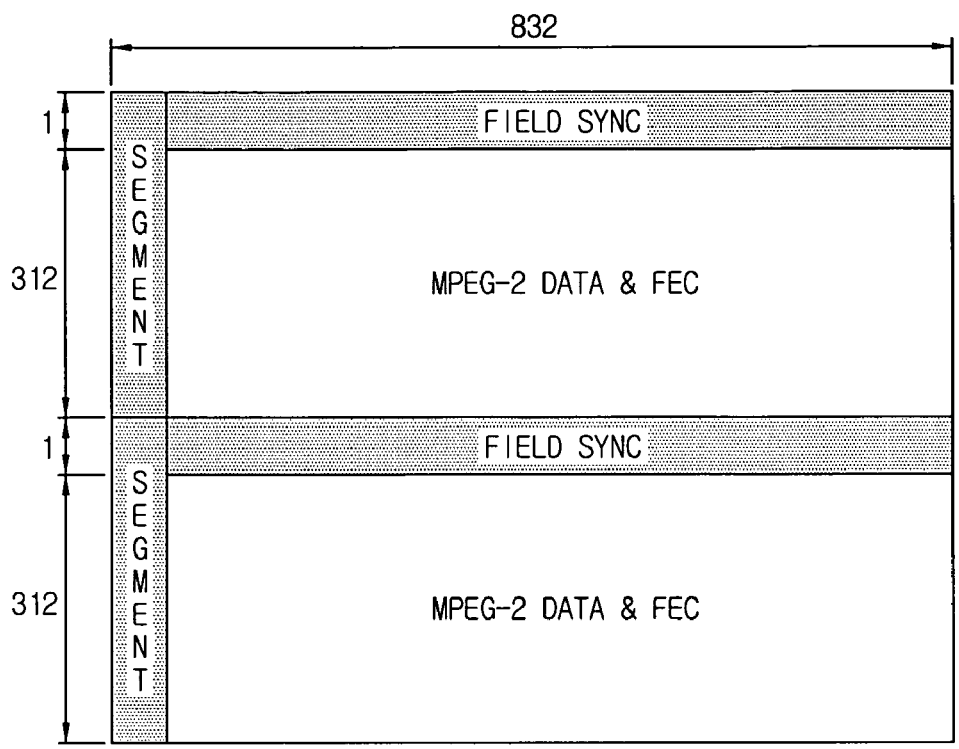
FIG. 2 is an exemplary view illustrating the frame structure of a conventional ATSC VSB data.

Certain embodiments of the present invention will be described in greater detail with reference to the accompanying drawings. In the following description, same drawing reference numerals are used for the like elements even in different drawings. The matters defined in the description such as a detailed construction and elements are nothing but the ones provided to assist in a comprehensive understanding of the invention. Thus, it is apparent that aspects of the present invention can be carried out without all of those defined matters as described in detail. Also, well-known functions or constructions are not described in detail since such detail would obscure the invention in unnecessary detail.

Figure 3:
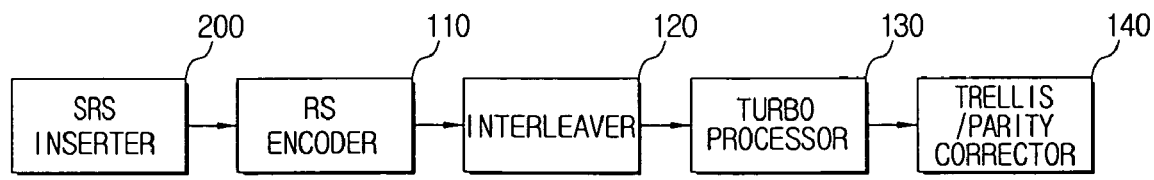
FIG. 3 is a block diagram illustrating the construction of a system for transmitting a digital broadcasting signal according to an embodiment of the present invention.

FIG. 3 is a block diagram illustrating the construction of a system for transmitting a digital broadcasting signal according to an embodiment of the present invention. Referring to FIG. 3, the system includes a supplementary reference signal (SRS) inserter 200, a Reed-Solomon (RS) encoder 110, an interleaver 120, a turbo processor 130, and a trellis/parity corrector 140. The supplementary reference signal inserter 200 receives a dual transport stream, and inserts a supplementary reference signal (SRS) into the dual transport stream. The SRS is a signal pattern commonly known to a transmitter side and a receiver side. In the broadcast receiver side, the channel state can be easily checked by comparing the SRS in the received stream with the known SRS. Accordingly, the degree of compensation can be determined using the SRS. However, it is understood that other training signals can be used.

The RS encoder 110 RS encodes the dual transport stream having the SRS inserted therein. The interleaver 120 interleaves the encoded dual transport stream. The turbo processor 130 detects only a turbo stream from the interleaved dual transport stream, and robustly processes the detected turbo stream by encoding and interleaving the turbo stream. The turbo processor 130 regenerates the dual transport stream by stuffing the dual transport stream with the robustly processed turbo stream. Then, the turbo processor 130 compensates for the parity that is changed due to the encoding of the turbo stream. The trellis/parity corrector 140 performs a trellis encoding of the turbo-processed dual transport stream. The trellis/parity corrector 140 also corrects the parity that is changed due to the trellis encoding.

Figure 4:
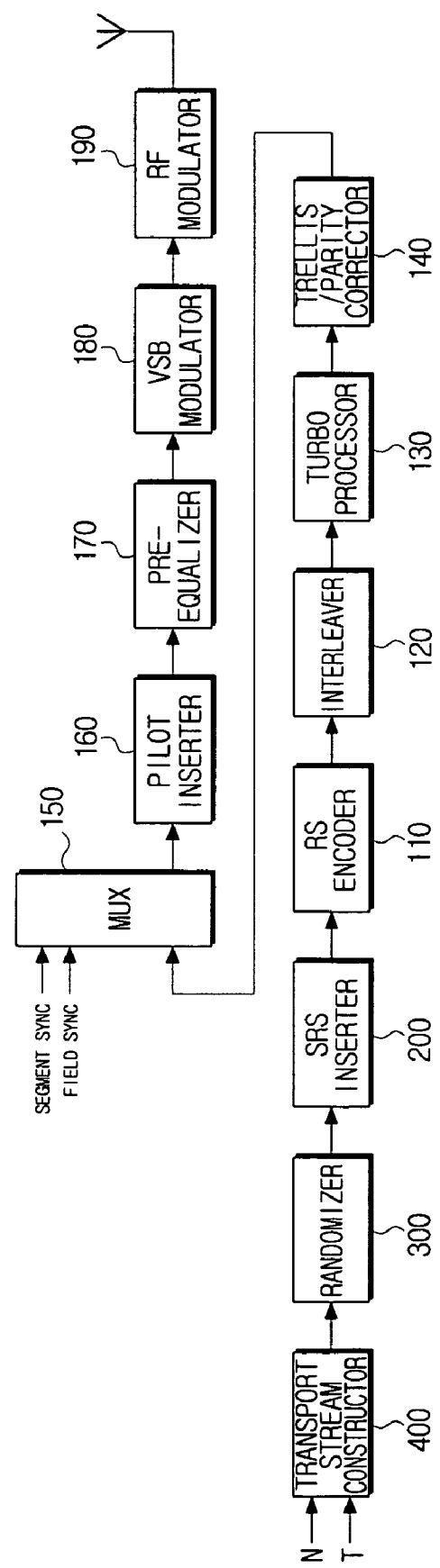
FIG. 4 is a block diagram illustrating the detailed construction of the system for transmitting a digital broadcasting signal of FIG. 3 according to an embodiment of the invention.

FIG. 4 is a block diagram illustrating the detailed construction of the system for transmitting a digital broadcasting signal of FIG. 3 according to an aspect of the invention. Referring to FIG. 4, the transport stream constructor 400 generates dual transport stream packets by receiving and multiplexing the normal stream (N) and the turbo stream (T). In this example, the transport stream constructor 400 provides a stuffing region for inserting the supplementary reference signal (SRS) for each packet of the dual transport stream. The transport stream constructor 400 also provides a separate parity insertion region with respect to the turbo stream. The parity insertion region is a region into which the parity for robustly processing the turbo stream in a turbo process is inserted. The parity insertion region may be provided among respective bits of the turbo stream, but can be otherwise located.

The stuffing region is a region provided for the insertion of the SRS into a part of the packet that is composed of a header and a payload. Specifically, the packet further includes an adaptation field. A part or all of the adaptation field can be used as the stuffing region. In this example, the adaptation field of the packet may further include a stuffing region into which data for initialization of the trellis/parity corrector 140 can be inserted, but this is not required in all aspects.

In another embodiment, the adaptation field includes an option field in which diverse packet information is recorded. The option field may refer to a program clock reference (PCR) used to synchronize a demodulator of a receiver; an original program clock reference (OPCR) used to record, reserve, and play programs in a receiver; a splice countdown that is the number of macroblocks each composed of four circuit blocks, a Cr block, and a Cb block; a transport private data length that is the length of text data of a text broadcast, and an adaptation field extension length. In this example, it is preferable, but not required, that the positions of the stuffing region and the option field do not overlap each other.

The randomizer 300 randomizes the dual transport stream received from in the transport stream constructor 400. The SRS inserter 200 inserts the SRS into the stuffing region of the randomized dual transport stream. The SRS is used for synchronization and/or channel equalization in the receiver side according to an aspect of the invention, but can also have additional functions. The RS encoder 110 and the interleaver 120 encode and interleave the dual transport stream into which the SRS has been inserted, respectively. The turbo processor 130 performs a turbo process on the encoded and interleaved dual transport stream.

Figure 5:
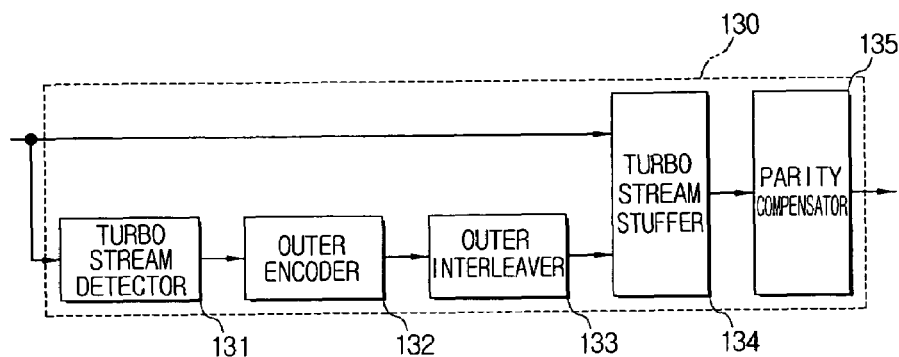
FIGS. 5 and 6 are block diagrams illustrating the construction of examples of a turbo processor according to an embodiment of the invention.
Figure 6:
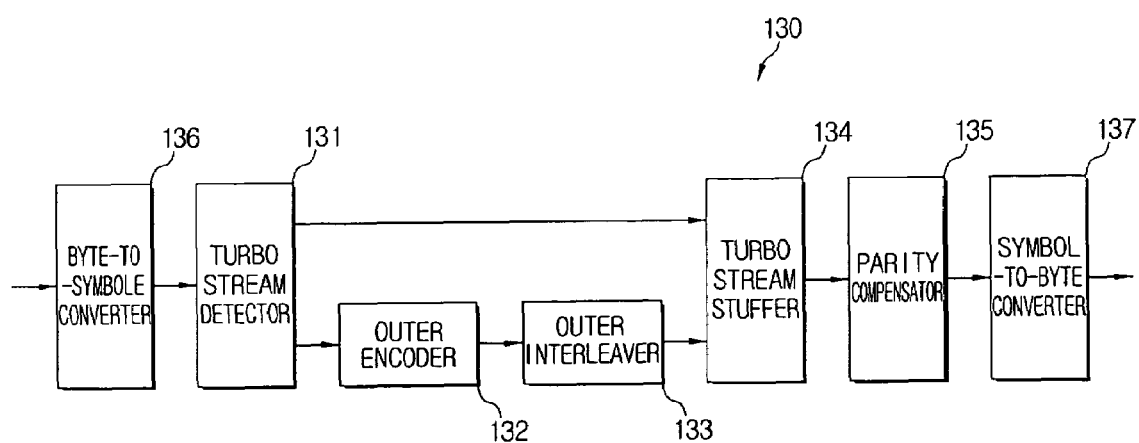

Examples of the construction of the turbo processor are illustrated in FIGS. 5 and 6. Referring to the embodiment in FIG. 5, the turbo processor 130 includes a turbo stream detector 131, an outer encoder 132, an outer interleaver 133, a turbo stream stuffer 134, and a parity compensator 135. The turbo stream detector 131 detects the turbo stream from the dual transport stream. While not required in all aspects, the turbo stream detector 131 may be implemented by a demultiplexer (DEMUX). The outer encoder 132 encodes the turbo stream by adding a parity to a parity insertion region provided in the detected turbo stream. The outer interleaver 133 interleaves the encoded turbo stream. The turbo stream stuffer 134 reconstructs the dual transport stream by multiplexing the interleaved turbo stream and the normal stream. The turbo stream stuffer 134 may be implemented by a multiplexer, but need not in all aspects.

The parity compensator 135 compensates for a parity error due to the encoding of the turbo stream by regenerating and adding the parity of the reconstructed dual transport stream to the dual transport stream.

FIG. 6 is a block diagram illustrating another example of the construction of the turbo processor 130 according to an embodiment of the present invention. Referring to FIG. 6, the turbo processor 130 further includes a byte-to-symbol converter 136 and a symbol-to-byte converter 137, in addition to the turbo stream detector 131, the outer encoder 132, the outer interleaver 133, the turbo stream stuffer 134, and the parity compensator 135. The byte-to-symbol converter 136 converts the unit of the dual transport stream interleaved by the interleaver 120 from byte to symbol. The conversion of the unit of the dual transport stream from byte to symbol can be easily understood with reference to Table D5.2 of "the US ATSC DTV standard (A/53)". The turbo stream detector 131 detects the turbo stream from the dual transport stream converted into the symbol unit. The outer encoder 132 encodes the turbo stream by calculating and inserting the parity for the detected turbo stream into the parity insertion region. In this embodiment, the outer encoder 132 performs an encoding of the turbo stream in the unit of a byte, but other units are possible.

The outer interleaver 133 interleaves the encoded turbo stream. In this example, the outer interleaver 133 performs an interleaving in the unit of a bit. The turbo stream stuffer 134 constructs the dual transport stream by multiplexing the interleaved turbo stream and the normal stream. Specifically, the turbo stream stuffer 134 constructs the dual transport stream by stuffing the turbo stream into the position before the turbo stream is detected by the turbo stream detector 131. The symbol-to-byte converter 137 converts the unit of the dual transport stream from symbol to byte. The conversion of the unit of the dual transport stream from symbol to byte can be easily understood with reference to Table D5.2 of "the US ATSC DTV standard (A/53)", the disclosure of which is incorporated by reference. An example of the byte-to-symbol table of table D5.2 is as follows:

| | Segment 0 | | | Segment 1 | | | Segment 2 | | | Segment 3 | | | Segment 4 | | |
|---|---|---|---|---|---|---|---|---|---|---|---|---|---|---|---|
| Symbol | Trellis | Byte | Bits | Trellis | Byte | Bits | Trellis | Byte | Bits | Trellis | Byte | Bits | Trellis | Byte | Bits |
| 0 | 0 | 0 | 7.6 | 4 | 208 | 5.4 | 8 | 412 | 3.2 | 0 | 616 | 1.0 | 4 | 828 | 7.6 |
| 1 | 1 | 1 | 7.6 | 5 | 209 | 5.4 | 9 | 413 | 3.2 | 1 | 617 | 1.0 | 5 | 829 | 7.6 |
| 2 | 2 | 2 | 7.6 | 6 | 210 | 5.4 | 10 | 414 | 3.2 | 2 | 618 | 1.0 | 6 | 830 | 7.6 |
| 3 | 3 | 3 | 7.6 | 7 | 211 | 5.4 | 11 | 415 | 3.2 | 3 | 619 | 1.0 | ... | ... | ... |
| 4 | 4 | 4 | 7.6 | 8 | 212 | 5.4 | 0 | 416 | 3.2 | 4 | 620 | 1.0 | ... | ... | ... |
| 5 | 5 | 5 | 7.6 | 9 | 213 | 5.4 | 1 | 417 | 3.2 | 5 | 621 | 1.0 | ... | ... | ... |
| 6 | 6 | 6 | 7.6 | 10 | 214 | 5.4 | 2 | 418 | 3.2 | 6 | 622 | 1.0 | ... | ... | ... |
| 7 | 7 | 7 | 7.6 | 11 | 215 | 5.4 | 3 | 419 | 3.2 | 7 | 623 | 1.0 | ... | ... | ... |
| 8 | 8 | 8 | 7.6 | 0 | 204 | 5.4 | 4 | 408 | 3.2 | 8 | 612 | 1.0 | ... | ... | ... |
| 9 | 9 | 9 | 7.6 | 1 | 205 | 5.4 | 5 | 409 | 3.2 | 9 | 613 | 1.0 | ... | ... | ... |
| 10 | 10 | 10 | 7.6 | 2 | 206 | 5.4 | 6 | 410 | 3.2 | 10 | 614 | 1.0 | ... | ... | ... |
| 11 | 11 | 11 | 7.6 | 3 | 207 | 5.4 | 7 | 411 | 3.2 | 11 | 615 | 1.0 | ... | ... | ... |
| 12 | 0 | 0 | 5.4 | 4 | 208 | 3.2 | 8 | 412 | 1.0 | 0 | 624 | 7.6 | ... | ... | ... |
| 13 | 1 | 1 | 5.4 | 5 | 209 | 3.2 | 9 | 413 | 1.0 | 1 | 625 | 7.6 | ... | ... | ... |
| ... | ... | ... | ... | ... | ... | ... | ... | ... | ... | ... | ... | ... | ... | ... | ... |
| 19 | 7 | 7 | 5.4 | 11 | 215 | 3.2 | 3 | 419 | 1.0 | 7 | 631 | 7.6 | ... | ... | ... |

-continued

| Symbol | Segment 0 | | | Segment 1 | | | Segment 2 | | | Segment 3 | | | Segment 4 | | |
|---|---|---|---|---|---|---|---|---|---|---|---|---|---|---|---|
| | Trellis | Byte | Bits | Trellis | Byte | Bits | Trellis | Byte | Bits | Trellis | Byte | Bits | Trellis | Byte | Bits |
| 20 | 8 | 8 | 5.4 | 0 | 204 | 3.2 | 4 | 408 | 1.0 | 8 | 632 | 7.6 | ... | ... | ... |
| 21 | 9 | 9 | 5.4 | 1 | 205 | 3.2 | 5 | 409 | 1.0 | 9 | 633 | 7.6 | ... | ... | ... |
| 22 | 10 | 10 | 5.4 | 2 | 206 | 3.2 | 6 | 410 | 1.0 | 10 | 634 | 7.6 | ... | ... | ... |
| 23 | 11 | 11 | 5.4 | 3 | 207 | 3.2 | 7 | 411 | 1.0 | 11 | 635 | 7.6 | ... | ... | ... |
| 24 | 0 | 0 | 3.2 | 4 | 208 | 1.0 | 8 | 420 | 7.6 | 0 | 624 | 5.4 | ... | ... | ... |
| 25 | 1 | 1 | 3.2 | 5 | 209 | 1.0 | 9 | 421 | 7.6 | 1 | 625 | 5.4 | ... | ... | ... |
| ... | ... | ... | ... | ... | ... | ... | ... | ... | ... | ... | ... | ... | ... | ... | ... |
| 31 | 7 | 7 | 3.2 | 11 | 215 | 1.0 | 3 | 427 | 7.6 | ... | ... | ... | ... | ... | ... |
| 32 | 8 | 8 | 3.2 | 0 | 204 | 1.0 | 4 | 428 | 7.6 | ... | ... | ... | ... | ... | ... |
| 33 | 9 | 9 | 3.2 | 1 | 205 | 1.0 | 5 | 429 | 7.6 | ... | ... | ... | ... | ... | ... |
| 34 | 10 | 10 | 3.2 | 2 | 206 | 1.0 | 6 | 430 | 7.6 | ... | ... | ... | ... | ... | ... |
| 35 | 11 | 11 | 3.2 | 3 | 207 | 1.0 | 7 | 431 | 7.6 | ... | ... | ... | ... | ... | ... |
| 36 | 0 | 0 | 1.0 | 4 | 216 | 7.6 | 8 | 420 | 5.4 | ... | ... | ... | ... | ... | ... |
| 37 | 1 | 1 | 1.0 | 5 | 217 | 7.6 | 9 | 421 | 5.4 | ... | ... | ... | ... | ... | ... |
| ... | ... | ... | ... | ... | ... | ... | ... | ... | ... | ... | ... | ... | ... | ... | ... |
| 47 | 11 | 11 | 1.0 | 3 | 227 | 7.6 | ... | ... | ... | ... | ... | ... | ... | ... | ... |
| 48 | 0 | 12 | 7.6 | 4 | 216 | 5.4 | ... | ... | ... | ... | ... | ... | ... | ... | ... |
| 49 | 1 | 13 | 7.6 | 5 | 217 | 5.4 | ... | ... | ... | ... | ... | ... | ... | ... | ... |
| ... | ... | ... | ... | ... | ... | ... | ... | ... | ... | ... | ... | ... | ... | ... | ... |
| 95 | 11 | 23 | 1.0 | ... | ... | ... | ... | ... | ... | ... | ... | ... | ... | ... | ... |
| 96 | 0 | 24 | 7.6 | ... | ... | ... | ... | ... | ... | ... | ... | ... | ... | ... | ... |
| 97 | 1 | 25 | 7.6 | ... | ... | ... | ... | ... | ... | ... | ... | ... | ... | ... | ... |
| ... | ... | ... | ... | ... | ... | ... | ... | ... | ... | ... | ... | ... | ... | ... | ... |
| 767 | 11 | 191 | 1.0 | ... | ... | ... | ... | ... | ... | ... | ... | ... | ... | ... | ... |
| 768 | 0 | 192 | 7.6 | ... | ... | ... | ... | ... | ... | ... | ... | ... | ... | ... | ... |
| 769 | 1 | 193 | 7.6 | ... | ... | ... | ... | ... | ... | ... | ... | ... | ... | ... | ... |
| ... | ... | ... | ... | ... | ... | ... | ... | ... | ... | ... | ... | ... | ... | ... | ... |
| 815 | 11 | 203 | 1.0 | 3 | 419 | 7.6 | 7 | 623 | 5.4 | 11 | 827 | 3.2 | ... | ... | ... |
| 816 | 0 | 204 | 7.6 | 4 | 408 | 5.4 | 8 | 612 | 3.2 | 0 | 816 | 1.0 | ... | ... | ... |
| 817 | 1 | 205 | 7.6 | 5 | 409 | 5.4 | 9 | 613 | 3.2 | 1 | 817 | 1.0 | ... | ... | ... |
| ... | ... | ... | ... | ... | ... | ... | ... | ... | ... | ... | ... | ... | ... | ... | ... |
| 827 | 11 | 215 | 7.6 | 3 | 419 | 5.4 | 7 | 623 | 3.2 | 11 | 827 | 1.0 | ... | ... | ... |

Figure 7:
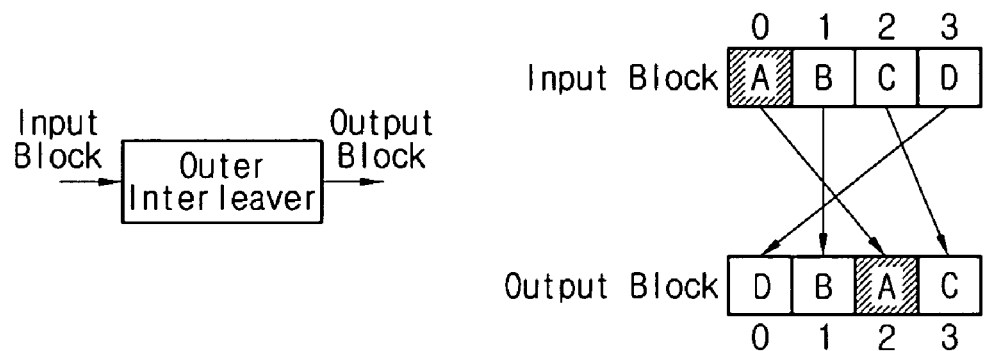
FIG. 7 is a view explaining an interleaving process performed by an outer interleaver according to an embodiment of the invention.

According to an aspect of the invention is a view explaining an interleaving process performed by the outer interleaver 133. Referring to FIG. 7, the outer interleaver 133 performs an interleaving according to a specified interleaving rule. For example, if "ABCD" are successively inputted in a state that the interleaving rule is {2, 1, 3, 0}, they are interleaved in the form of "DBAC".

Referring again to FIG. 4, the regenerated dual transport stream turbo-processed by the turbo processor 130 is inputted to the trellis/parity corrector 140. The trellis/parity corrector 140 performs a trellis encoding of the respective packs of the dual transport stream, and corrects the parity.

Figure 8:
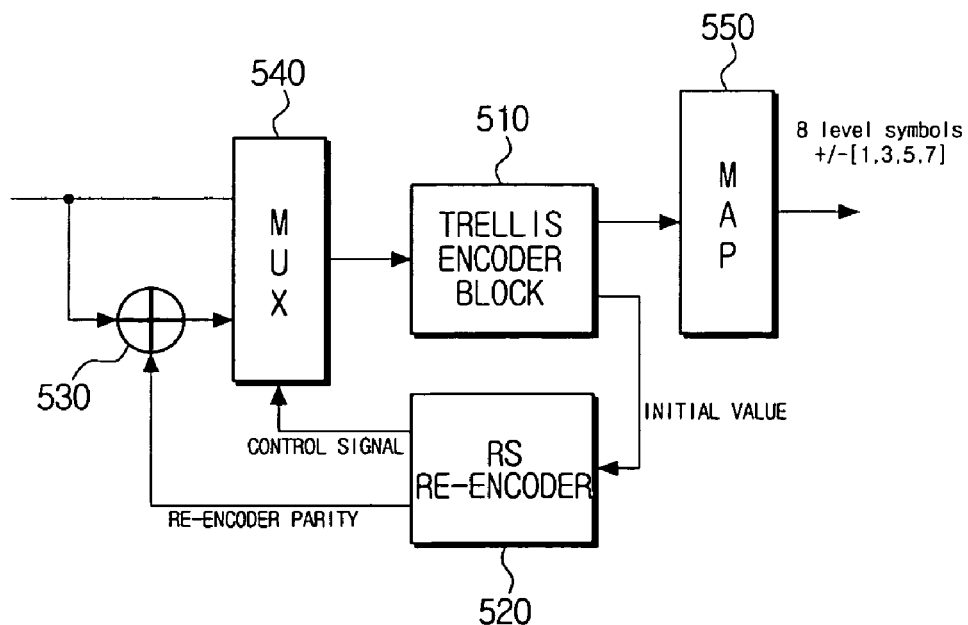
FIG. 8 is a block diagram illustrating the construction of an example of a trellis/parity corrector according to an embodiment of the invention.

FIG. 8 is a block diagram illustrating the construction of an example of a trellis/parity corrector 140 according to an aspect of the invention. Referring to FIG. 8, the trellis/parity corrector 140 includes a trellis encoder block 510, an RS re-encoder 520, an adder 530, a MUX 540, and a mapper 550. While not required in all aspects, the MUX 540 has i) an operation mode for performing the trellis encoding (hereinafter referred to as a "normal mode"), and ii) an operation mode for performing a trellis encoding of the packets added by the adder 530 (hereinafter referred to as a "parity correction mode"). The operation mode of the MUX 540 is determined by a control signal received from the RS re-encoder 520.

The trellis encoder block 510 performs the trellis encoding of the packets received from the MUX 540. The trellis encoder block 510 can perform the trellis encoding of the packets according to an external control signal, and it is preferable (but not required) that the trellis encoder block 510 is initialized before it performs the trellis encoding of the SRS data of the packet. The RS re-encoder 520 regenerates the parity corresponding to the changed packet in the process of initializing the trellis encoder block 510. The adder (exclusive OR gate) 530 adds the re-encoded parity to the packet received from the turbo processor 130, and provides the packet to the MUX 540. Here, the addition is as follows:

A) . . . omitted . . . 10100101011<u>00</u>1010101011AAA
A . . . omitted . . .
B) . . . omitted . . . 00000000000<u>01</u>0000000000BBB
B . . . omitted . . .
C) . . . omitted . . . 10100101011<u>01</u>1010101011CCC
C . . . omitted . . .

A) is a packet received from the turbo processor 130. B) is an RS-encoded packet. C) is the result of exclusive-OR-gating A) and B). When the underlined part of A) is inputted to the trellis encoder block 510, an initialization process is performed. In this example, a value corresponding to a value pre-stored in the trellis encoder block 510 is provided to the RS re-encoder 520, and the RS re-encoder 520 outputs the packet B) by adding the parity to the provided value. The underlined part of the packet B) is the changed value corresponding to the underlined part of the packet A). It can be understood that the parity corresponding to the underlined part of the packet B) is regenerated as BBBBB.

The adder 530 exclusive-OR-gates the packet A) and the packet B), and outputs the packet C). In the packet C), the underlined part of the initially inputted packet A) has been changed to "01", and the parity has also been changed from AAAAA to CCCCC.

The MUX 540 operates in a normal operation mode in a state that the initialization and the parity correction have been completed, and provides the dual transport stream to the trellis encoder block 510. The mapper 550 performs a symbol mapping of the trellis-encoded packet to an 8-level to output the symbol-mapped packet.

Figure 9:
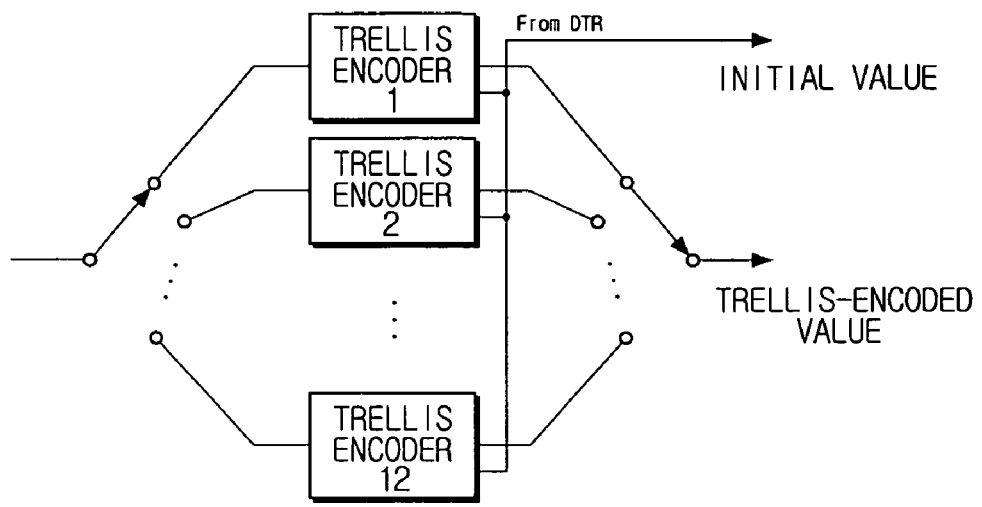
FIG. 9 is a block diagram illustrating the construction of an example of a trellis encoder block according to an embodiment of the invention.

FIG. 9 is a block diagram illustrating the construction of an example of a trellis encoder block 540 according to an aspect of the invention. The trellis encoder block 510 of FIG. 9 includes 12 trellis encoders 1 to 12. The trellis encoders 1 to 12 are selected in order according to the received packets, and output respective trellis-encoded values. As described above, in the initialization period, the trellis encoder of the block 510 provides the value corresponding to the value pre-stored in an inner register (not illustrated) of the trellis encoder to the RS re-encoder 520 as the initial value.

Figure 10:
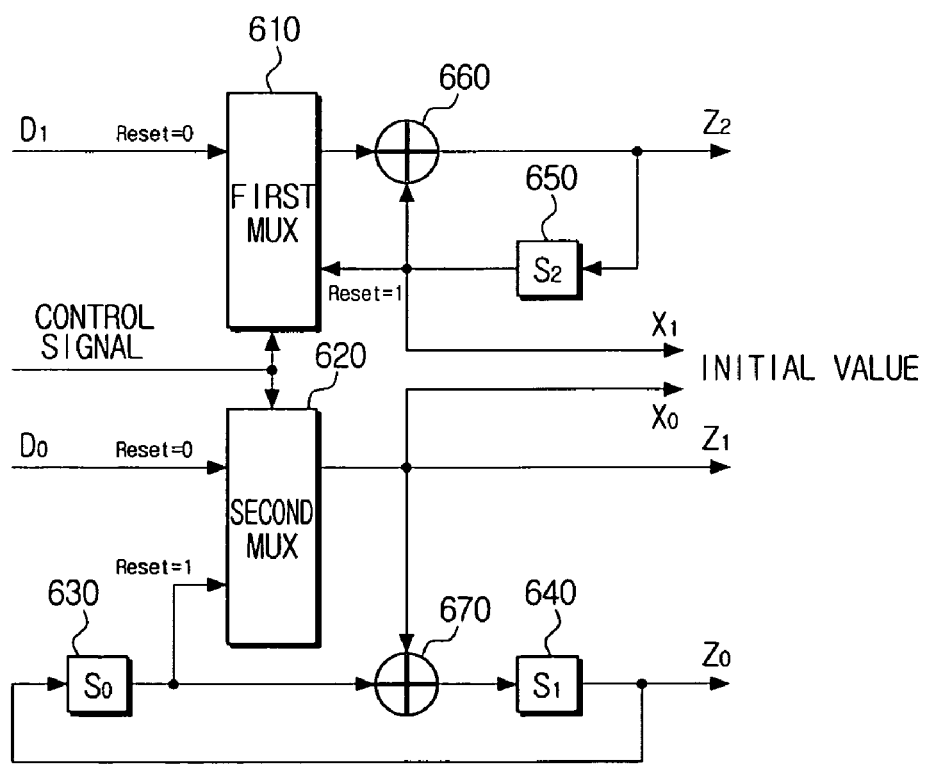
FIG. 10 is a block diagram illustrating the construction of an example of a trellis encoder according to an embodiment of the invention.

FIG. 10 is a block diagram illustrating the construction of an example of a trellis encoder used in the trellis encoder block 510 of FIG. 9. The trellis encoder of FIG. 10 includes two MUXs 610 and 620, three memories 630, 640, and 650, and two adders 660 and 670. The shown trellis encoder performs the initialization before it performs the trellis encoding of the SRS included in the interleaved dual transport stream. That is, if the stream corresponding to the stuffing region provided for the initialization in the adaptation field is inputted to the trellis encoder, the trellis encoder performs the initialization.

At the start of the initialization period, a control signal is inputted to the first MUX 610 and the second MUX 620. The first MUX 610 selects either a value stored in the memory (S2) 650 or D1 according to the control signal, and outputs the selected value to the first adder 660. The second MUX 620 selects either a value stored in the memory (S0) 630 or D0 according to the control signal, and outputs the selected value to the second adder 670.

By way of example, If the control signal "1" is input, the first MUX 610 selects the value stored in the memory (S2) 650, and outputs the selected value to the first adder 660. The first adder 660 adds the output value of the first MUX 610 and the value stored in the memory (S2) 650. The resultant value of addition is output as Z2, and is simultaneously stored in the memory (S2) 650. In this case, since the two input values of the first adder 660 are the same, the output value of the first adder 660 always becomes "0". Accordingly, "0" is stored in the memory (S2) 650 to realize the initialization.

As described above, the input value D1 is replaced by the value stored in the memory (S2) 650. Accordingly, the parities added to the dual transport stream including the input value D1 differ. In order to compensate for this parity error, the value existing in the memory (S2) 650 is output to the RS re-encoder 520 as an initial value X1.

Additionally, if the control signal "1" is input, the second MUX 620 selects the value stored in the memory (S0) 630, and outputs the selected value as an output Z1. This output signal is simultaneously input to the second adder 670. The output value of the second MUX 620 is also output as an initial value X0. The value stored in the memory (S0) 630 is also provided to the second adder 670. Accordingly, the second adder 670 adds two equal values, and outputs "0". Since the output value of the second adder 670 is stored in the memory (S1) 640 as it is, the memory (S1) 640 is initialized to "0". Simultaneously, the value stored in the memory (S1) 640 is shifted to the memory (S0) 630. Also, the value stored in the memory (S1) 640 is output as an output Z0.

If the control signal "1" is input again in this state, the value "0" stored in the memory (S1) 640 is shifted to the memory (S0) 630, so that the memory (S0) 630 is also initialized. Simultaneously, the second MUX 620 outputs the value currently stored in the memory (S0) 630 (e.g., the value stored in the memory (S1) 640 before the initialization) as the output value X0. This output value X0 is also provided to the RS re-encoder 520 together with the output value X1.

In a period that is not the initialization period, the control signal 0 is outputted to the first MUX 610 and the second MUX 620. Accordingly, the input values D0 and D1 are selected and then trellis-encoded. The control signal 0 or the control signal 1 can be received from a separately provided control signal generator (not illustrated) according to an aspect of the invention.

As described above, if the initialization proceeds, the respective trellis encoders output the values corresponding to the pre-stored values of the memories as the initial values. Additionally, since two memories 630 and 640 are arranged on the second MUX 620 side, a control signal having two symbols is used to initialize the memories. Also, 8 initial values (000, 111, 001, 010, 100, 110, 101, 011) can be generated using the three registers (i.e., memories 630, 640, and 650). The values X0 and X1 corresponding to the respective initial values are provided to the RS re-encoder 520, so as to change the parity. The operation of the RS re-encoder 520 is as described above with reference to FIG. 8. However, it is understood that other numbers of memories in the trellis encoders can be used and that the trellis encoder block 510 can be otherwise configured.

A reset process of the trellis encoder of FIG. 10 can be explained in detail with reference to Table 1.

TABLE 1

| Reset at t = 0 | (S0, S1, S2), (X0, X1) at t = 0 | (S0, S1, S2), (X0, X1) at t = 1 | (S0, S1, S2) Next Stage at t = 2 | Output Z2 Z1 Z0 |
|---|---|---|---|---|
| 1 | (0, 0, 0), (0, 0) | (0, 0, 0), (0, 0) | (0, 0, 0) | 000 |
| 1 | (0, 0, 1), (0, 1) | (0, 0, 0), (0, 0) | (0, 0, 0) | 000 |
| 1 | (0, 1, 0), (0, 0) | (1, 0, 0), (1, 0) | (0, 0, 0) | 000 |
| 1 | (0, 1, 1), (0, 1) | (1, 0, 0), (1, 0) | (0, 0, 0) | 000 |
| 1 | (1, 0, 0), (1, 0) | (0, 0, 0), (0, 0) | (0, 0, 0) | 000 |
| 1 | (1, 0, 1), (1, 1) | (0, 0, 0), (0, 0) | (0, 0, 0) | 000 |
| 1 | (1, 1, 0), (1, 0) | (1, 0, 0), (1, 0) | (0, 0, 0) | 000 |
| 1 | (1, 1, 1), (1, 1) | (1, 0, 0), (1, 0) | (0, 0, 0) | 000 |

In Table 1, if the control signal (e.g., reset signal) becomes "1" at t=0, the initialization starts, and the values of S0, S1, and S2 all become "0" after the time point of t=2. Accordingly, the initialization is completed during the 2-symbol clock period.

Referring again to FIG. 4, the MUX 150 multiplexes the trellis-encoded dual transport stream by adding a segment sync signal and a field sync signal to the trellis-encoded dual transport stream. The pilot inserter 160 inserts a pilot into the dual transport stream having the added sync signals by adding a specified DC value to the dual transport stream. The pre-equalizer 170 equalizes the dual transport stream having the inserted pilot to minimize intersymbol interference. The VSB modulator 180 performs a VSB modulation of the equalized dual transport stream. The RF modulator 190 modulates the VSB-modulated dual transport stream with an RF channel band signal and transmits the modulated dual transport stream. While not required in all aspects, transmission can be through air, cable, internet, satellite, and other like media. Also, transmission can include recording on a medium for delayed playback.

In FIG. 4, parts of the MUX 150 through the RF modulator 190 are constituent elements that participate in transmission of the dual transport stream, and are called a transmitter in the following description. One or more of the MUX 150 through the RF modulator 190 that constitute the transmitter may be omitted, or general constituent elements required for the transmission may be added to the transmitter according to other aspects of the invention.

Figures 11, 12:
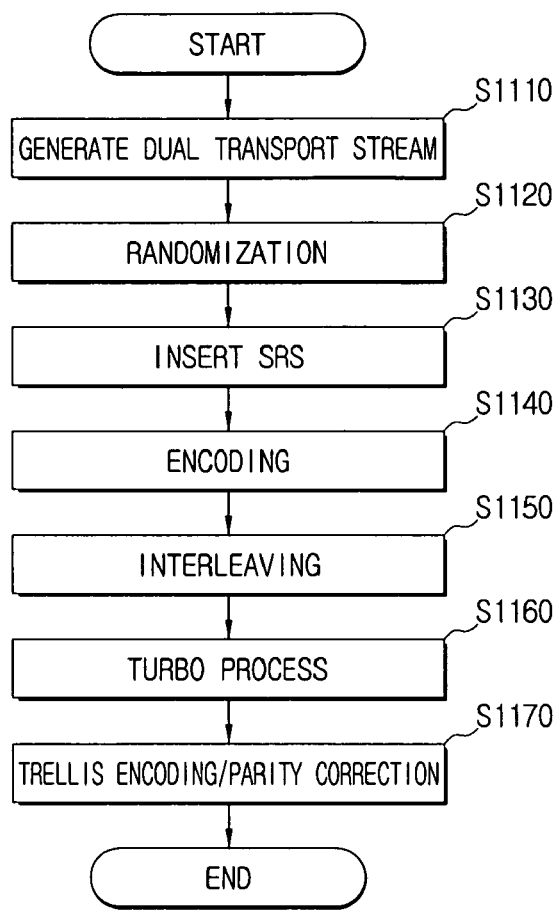
FIG. 11 is a flowchart illustrating a method of processing a digital broadcasting signal according to an embodiment of the present invention.
FIG. 12 is a view explaining the structure of a dual transport stream that is transmitted by the system for transmitting a digital broadcasting signal according to an embodiment of the present invention.

FIG. 11 is a flowchart illustrating a method of processing a digital broadcasting signal according to an embodiment of the present invention. Referring to FIG. 11, if the dual transport stream is generated and received (S1110), the received dual transport stream is randomized (S1120). Then, an SRS is inserted into a stuffing region provided in the respective packet of the dual transport stream (S1130). In this state, the dual transport stream into which the SRS has been inserted is encoded (S1140), and then interleaved (S1150). Thereafter, a turbo process is performed with respect to the interleaved dual transport stream (S1160).

As described above, the turbo process is a process of detecting only the turbo stream from the dual transport stream, encoding and interleaving the detected turbo stream, and then inserting the encoded and interleaved turbo stream into the dual transport stream again. In this case, since the turbo process is performed after the encoding operation (S1140), a parity compensation process is additionally performed in order to prevent the parity from being changed due to the turbo process. When the turbo process is completed, the trellis encoding and parity correcting processes are performed (S1170). These trellis encoding and parity correcting processes have been explained in detail, a duplicate explanation thereof will be omitted. While not required in all aspects, elements of this method can be performed as software encoded on one or more media to be implemented using one or more processors and/or computers.

FIG. 12 is a view explaining the structure of a dual transport stream that is transmitted by the system for transmitting a digital broadcasting signal according to an embodiment of the present invention. The dual transport stream of FIG. 12 is composed of plural successive packets. Specifically, 78 packets of the turbo stream are inserted into 312 packets of one field of the dual transport stream. Accordingly, in the dual transport stream, packets of the turbo stream and the normal stream are repeatedly arranged by four packets in the ratio of 1:3. That is, one packet (188 bytes) of the turbo stream and three packets (3×188 bytes) of the normal stream are successively arranged. In the case of inserting 70 packets of the turbo stream in the 312 segments of the dual transport stream, one packet of the turbo stream and three packets of the normal stream are repeatedly arranged 70 times, and the remaining 32 packets are provided as the normal stream packets. Since an SRS of S bytes is inserted into each packet, the size of the turbo stream becomes 182-S bytes. However, it is understood that other packet arrangements, ratios and/or byte sizes can be used in other aspects of the invention.

As described above, the system for transmitting a digital broadcasting signal and the method thereof according to aspects of the present invention can improve the performance by performing an information exchange and mapping on a dual transport stream including a normal stream and a turbo stream in order to improve the receiving performance of an ATSC VSB system that is an American type digital terrestrial broadcasting system. In particular, the system having a simple construction can improve the receiving performance even in diverse receiving environments, as it is compatible with the existing normal data transmission system. In addition, the channel state can be easily seized by using the supplementary reference signal.

The foregoing embodiments and advantages are merely exemplary and are not to be construed as limiting the present invention. Aspects of the present teaching can be readily applied to other types of apparatuses. Also, the description of the embodiments of the present invention is intended to be illustrative, and not to limit the scope of the claims or equivalents thereto, and many alternatives, modifications, and variations will be apparent to those skilled in the art.

What is claimed is:

1. A system for transmitting a digital broadcasting signal, comprising:
    a supplementary reference signal inserter receiving a dual transport stream having a multiplexed normal stream and a turbo stream, and inserting a supplementary reference signal into a stuffing region provided in the received dual transport stream;
    a Reed-Solomon (RS) encoder encoding the dual transport stream having the inserted supplementary reference signal;
    an interleaver interleaving the encoded dual transport stream;
    a turbo processor detecting and encoding the turbo stream from the interleaved dual transport stream, encoding the detected turbo stream, stuffing the dual transport stream with the encoded turbo stream, and compensating the stuffed dual transport stream for a parity corresponding to the encoded turbo stream; and
    a trellis/parity corrector performing a trellis encoding of the dual transport stream processed by the turbo processor.

2. The system as claimed in claim 1, further comprising a transport stream constructor multiplexing the normal stream and the turbo stream to generate the multiplexed dual transport stream.

3. The system as claimed in claim 2, further comprising a randomizer randomizing the multiplexed dual transport stream generated by the transport stream constructor and providing the randomized transport stream to the supplementary reference signal inserter.

4. The system as claimed in claim 1, wherein the turbo processor comprises:
    a turbo stream detector detecting the turbo stream from the interleaved dual transport stream;
    an outer encoder inserting the parity for the detected turbo stream into a parity insertion region;
    an outer interleaver interleaving the turbo stream processed by the outer encoder;
    a turbo stream stuffer reconstructing the dual transport stream by inserting the interleaved turbo stream into the dual transport stream; and
    a parity compensator regenerating and adding the parity of the reconstructed dual transport stream to the dual transport stream.

5. The system as claimed in claim 4, wherein the turbo processor further comprises:
    a byte-to-symbol converter converting a unit of the interleaved dual transport stream from byte to symbol; and
    a symbol-to-byte converter converting a unit of the dual transport stream, to which the parity regenerated by the parity compensator has been added, from symbol to byte.

6. The system as claimed in claim 1, further comprising a transmitter transmitting the trellis-encoded dual transport stream.

7. The system as claimed in claim 6, wherein the transmitter comprises:
    a multiplexer (MUX) adding a sync signal to the trellis-encoded dual transport stream;
    a pilot inserter inserting a pilot into the dual transport stream having the added sync signal;

a pre-equalizer equalizing the dual transport stream having the inserted pilot;

a Vestigial Side Band (VSB) modulator performing a VSB modulation of the equalized dual transport stream; and an RF modulator modulating the VSB-modulated dual transport stream with an RF channel band signal to transmit the modulated dual transport stream.

8. The system as claimed in claim 1, wherein the trellis/parity corrector performs initialization before encoding the supplementary reference signal, and compensates for the parity according to a value that is changed due to the initialization.

9. The system as claimed in claim 8, wherein the trellis/parity corrector comprises:

a trellis encoder block that performs the initialization when an external control signal corresponding to an initialization region is received and outputs a pre-stored value as an initial value;

an RS encoder generating a parity corresponding to the initial value; and an adder correcting the parity of the dual transport stream by adding the parity generated by the RS encoder to the dual transport stream.

10. The system as claimed in claim 9, wherein the trellis/parity corrector further comprises:

a multiplexer providing the dual transport stream having the corrected parity corrected to the trellis encoder block; and a mapper performing a symbol mapping of the dual transport stream trellis-encoded by the trellis encoder block.

11. The system as claimed in claim 9, wherein the trellis encoder block includes a plurality of trellis encoders.

12. The system as claimed in claim 11, wherein each trellis encoder comprises:

a plurality of memories storing specified values;

a first multiplexer receiving and outputting one of two bits located before an input of the supplementary reference signal, and when the external control signal is received, selecting and outputting a storage value stored in a first one of the memories;

a first adder adding an output value output from the first multiplexer and the storage value stored in the first memory, and storing an addition output value in the first memory;

a second multiplexer receiving and outputting the other of the two bits located before the input of the supplementary reference signal, and when the external control signal is received, selecting and outputting a storage value stored in a second one of the memories; and a second adder adding an output value of the second multiplexer and the storage value stored in the second memory, and storing an addition output value in a third one of the memories;

wherein the value pre-stored in the third memory is shifted to and stored in the second memory, and the value pre-stored in the first memory and the value pre-stored in the second memory are provided to the RS encoder as the initial values.

13. A method of processing a digital broadcasting signal, comprising:

receiving, by a supplementary reference signal inserter of a digital broadcasting system, a dual transport stream having a multiplexed normal stream and turbo stream;

inserting, by the supplementary reference signal inserter, a supplementary reference signal into a stuffing region provided in the multiplexed dual transport stream;

encoding, by a Reed-Solomon (RS) encoder of the digital broadcasting system, the dual transport stream having the inserted supplementary reference signal;

interleaving, by an interleaver of the digital broadcasting system, the encoded dual transport stream;

performing a turbo process via a turbo processor of the digital broadcasting system, by detecting the turbo stream from the interleaved dual transport stream, encoding the detected turbo stream, stuffing the dual transport stream with the encoded turbo stream, and compensating the stuffed dual transport stream for a parity corresponding to the encoded turbo stream; and performing a trellis encoding of the turbo-processed dual transport stream via a trellis/parity corrector of the digital broadcasting system.

14. The method as claimed in claim 13, further comprising by multiplexing the normal stream and the turbo stream prior to receiving the dual transport stream.

15. The method as claimed in claim 14, further comprising, prior to the receiving the dual transport stream, randomizing the multiplexed dual transport stream.

16. The method as claimed in claim 13, wherein the performing the turbo process comprises:

performing an outer encoding of the detected turbo stream by inserting the parity for the detected turbo stream into a parity insertion region;

interleaving the outer-encoded turbo stream;

reconstructing the dual transport stream by inserting the interleaved turbo stream into the dual transport stream; and regenerating and adding the parity of the reconstructed dual transport stream to the dual transport stream.

17. The method as claimed in claim 16, wherein the performing the turbo process further comprises:

converting a unit of the interleaved dual transport stream from byte to symbol; and converting a unit of the dual transport stream having the added regenerated parity from symbol to byte.

18. The method as claimed in claim 13, further comprising adding a sync signal to the trellis-encoded dual transport stream, and transmitting the dual transport stream having the added sync signal.

19. The method as claimed in claim 18, wherein the transmitting the dual transport stream comprises:

inserting a pilot into the dual transport stream having the added sync signal;

equalizing the dual transport stream having the inserted pilot;

performing a Vestigial Side Band (VSB) modulation of the equalized dual transport stream; and modulating the VSB-modulated dual transport stream with an RF channel band signal to transmit the modulated dual transport stream.

20. The method as claimed in claim 13, wherein the performing the trellis encoding comprises:

initializing a trellis encoder performing the trellis encoding; and compensating for the parity of the dual transport stream, using the parity for the initial value corresponding to the value pre-stored in the trellis encoder.

21. A system for transmitting a digital broadcasting signal, comprising:

an encoder which receives a dual transport stream having a multiplexed normal stream and a turbo stream, inserts a training sequence into a stuffing region of the received dual transport stream, Reed-Solomon (RS) encodes the dual transport stream, interleaves the RS encoded dual transport stream, encodes the turbo stream of the interleaved dual transport stream, stuffs the dual transport stream with the encoded turbo stream, and compensates the stuffed dual transport stream for a parity corresponding to the encoded turbo stream; and a trellis/parity corrector performing a trellis encoding of the dual transport stream processed by the encoder.

22. The system as claimed in claim 21, further comprising a transport stream constructor multiplexing the normal stream and the turbo stream to generate the multiplexed dual transport stream.

23. The system as claimed in claim 22, further comprising a randomizer randomizing the multiplexed dual transport stream generated by the transport stream constructor and providing the randomized transport stream to the encoder.

24. The system as claimed in claim 21, wherein the trellis/parity corrector performs an initialization before encoding the supplementary reference signal, and compensates for the parity according to a value that is changed due to the initialization.

25. The system as claimed in claim 24, wherein the trellis/parity corrector comprises:
a trellis encoder block that performs the initialization when an external control signal corresponding to an initialization region is received and outputs a pre-stored value as an initial value;
an RS encoder generating a parity corresponding to the initial value; and
an adder correcting the parity of the dual transport stream by adding the parity generated by the RS encoder to the dual transport stream.

26. The system as claimed in claim 25, wherein the trellis/parity corrector further comprises:
a multiplexer providing the dual transport stream having the corrected parity to the trellis encoder block; and
a mapper performing a symbol mapping of the dual transport stream trellis-encoded by the trellis encoder block.

27. The system as claimed in claim 25, wherein the trellis encoder block includes a plurality of trellis encoders.

28. The system as claimed in claim 27, wherein each trellis encoder comprises:
a plurality of memories storing specified values;
a first multiplexer receiving and outputting one of two bits located before an input of the supplementary reference signal, and when the external control signal is received, selecting and outputting a storage value stored in a first one of the memories;
a first adder adding an output value output from the first multiplexer and the storage value stored in the first memory, and storing an addition output value in the first memory;
a second multiplexer receiving and outputting the other of the two bits located before the input of the supplementary reference signal, and when the external control signal is received, selecting and outputting a storage value stored in a second one of the memories; and
a second adder adding an output value of the second multiplexer and the storage value stored in the second memory, and storing an addition output value in a third one of the memories;
wherein the value pre-stored in the third memory is shifted to and stored in the second memory, and the value pre-stored in the first memory and the value pre-stored in the second memory are provided to the RS encoder as the initial values.

29. The system as claimed in claim 28, wherein the output value output from the first multiplexer and the storage value stored in the first memory when received as the first adder are the same such that the output value of the first adder is always "0" such that the first memory stores a "0" to realize the initialization.

30. The system as claimed in claim 28, wherein the output value output from the second multiplexer and the storage value stored in the second memory when received as the second adder are the same such that the output value of the second adder is always "0" such that the third memory stores a "0" to realize the initialization.

* * * * *